United States Patent [19]

Dannenmann, Jr. et al.

[11] 4,286,114

[45] Aug. 25, 1981

[54] TWO-WIRE RESISTANCE BRIDGES FOR PRIVATE LINE CIRCUITS

[75] Inventors: John E. Dannenmann, Jr.; Bill E. Johnson, both of Portland, Oreg.

[73] Assignee: Bejed, Inc., Portland, Oreg.

[21] Appl. No.: 120,840

[22] Filed: Feb. 12, 1980

[51] Int. Cl.$^3$ .......................... H04B 1/58; H04M 3/56
[52] U.S. Cl. .................... 179/1 CN; 333/130
[58] Field of Search ........ 179/1 CN, 18 BC, 170 NC; 333/130, 124, 100

[56] References Cited

U.S. PATENT DOCUMENTS 4,140,875  2/1979  Johnson et al. ................. 179/1 CN

FOREIGN PATENT DOCUMENTS 1353367  5/1974  United Kingdom ................. 179/1 CN Primary Examiner—Joseph A. Popek

[57] ABSTRACT

A family of improved 2-wire resistance bridges having from 3 to 14 ports, or legs, is provided for use in interconnecting a plurality of stations or devices in a private line circuit. The bridges include a resistance connected in shunt across the common end of each leg in the bridge, which permits the intrinsic port-to-port loss of the bridges to be adjusted to a desired value that essentially equals the difference between standard toll line input and output power levels, while at the same time maintaining the proper terminating impedance for each of the interconnected devices.

3 Claims, 2 Drawing Figures

TWO-WIRE RESISTANCE BRIDGES FOR PRIVATE LINE CIRCUITS

BACKGROUND AND OBJECTS OF THE INVENTION

The present invention relates generally to low frequency, or "voiceband", wire transmission systems, and more particularly to a family of improved 2-wire multiport resistance bridges, or branching networks, for interconnecting a plurality of stations or devices in such a system.

In addition to their role in providing and maintaining the nationwide public telephone system, the Bell System and other telephone operating companies furnish private line circuits for various applications. Examples include circuits used for private voice communications, digital data transmission, security or fire alarm monitoring, and the like. Such circuits typically have a relatively small number of interconnected lines or stations (compared with a public communications circuit), and are specifically engineered for the particular service.

The various "legs" of a multistation private line circuit are interconnected in the telephone company central office by means of a resistance bridge that provides the proper terminating inpedance (typically 600 ohms) for each of the connected legs. Depending on the particular application, each leg may consist of a single pair of wires or two associated pairs, the latter arrangement being used to provide separate transmission paths for each direction of communication. Circuits of the 2-wire type, and some of the 4-wire variety, are formed using 2-wire bridges to interconnect the legs—an arrangement referred to as "split bridge" operation in the case of a 4-wire circuit. FIG. 1 of the accompanying drawing shows a conventional 2-wire, N-port bridge in schematic form. The port-to-port loss of such a bridge varies according to the maximum number of legs it is designed to accomodate. For example, a conventional 2-wire, 4-port bridge for 600 ohm lines has a natural insertion loss of about 9.5 dB, while the port-to-port loss of a similar 12-port bridge is about 20.8 dB and that of a 15-port bridge is 22.9 dB. On standard toll lines, signals are received at +7 dBm and sent out at −16 dBm, a power difference of 23 dB from input to output. Accordingly, when a 2-wire bridge with fewer than 15 ports is used, additional attenuation or "padding" must be added to the circuit to match the standardized power levels. This is typically done by connecting the bridge to an external attenuating pad with jumper wires.

In U.S. Pat. No. 4,140,875, issued Feb. 20, 1979, it is pointed out that no external padding is required for a 4-wire, 8-port 600 ohm bridge. Such a bridge has a natural loss of about 22.6 dB, and the additional loss needed to reach the desired 23.0 dB level normally is accounted for by the central office cabling. Significant economic and other benefits would be realized by eliminating the need to use external pads with 2-wire bridges of fewer than 15 ports, especially the common 4-, 8- and 12-port sizes, when setting up multistation private line circuits. Accordingly, a primary object of the present invention is to provide a family of improved 2-wire, N-port resistance bridges (N being less than 15) having an intrinsic loss sufficiently high that no additional padding is needed to achieve a line input-to-output attenuation ratio of 23 dBm.

A more specific object of the invention is to provide a family of 2-wire, N-port bridges having an intrinsic insertion loss of about 22.6 dB.

Another object of the invention is to provide 2-wire, N-port bridges that are less sensitive to inaccuracies in port terminations.

Still another object is to provide 2-wire multiport bridges in which unused ports need not be terminated with the characteristic impedance of the bridge to achieve satisfactory results.

The true scope of the present invention is set forth with particularity in the appended claims. However, the various objects, features and advantages of the invention will be better understood and appreciated by reference to the accompanying drawing and the following description of the best mode contemplated for its practice.

DESCRIPTION OF PREFERRED EMBODIMENT

Figure 1:
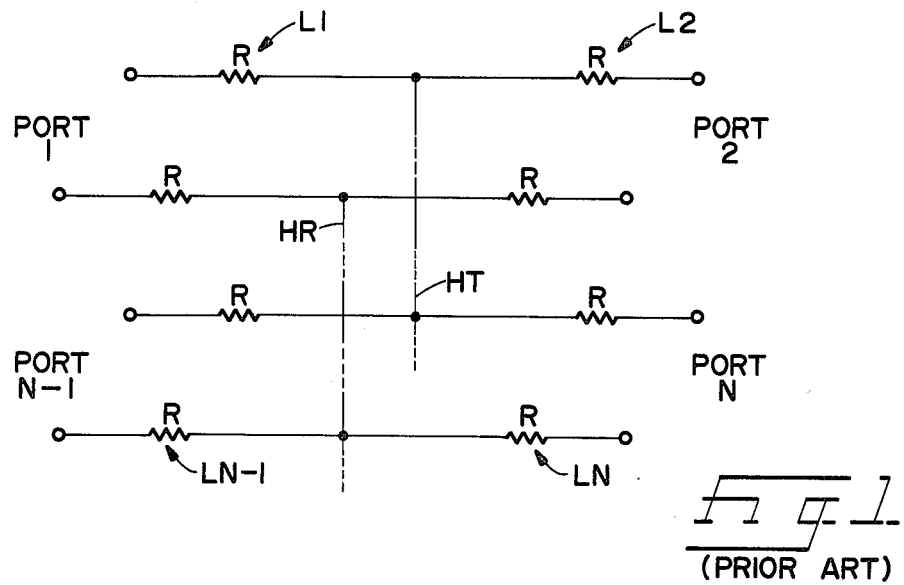
FIG. 1 is schematic diagram of a prior art 2-wire, 4-port resistance bridge.

A conventional 2-wire, N-port resistance bridge is schematically depicted in FIG. 1. As will be seen, the bridge includes four identical legs L1–LN, each of which include a pair of terminals for connection to an external circuit or transmission line. These two terminals, which define an input/output port for the bridge, are each connected via individual resistors R to a corresponding one of two central busses, or "hubs", HT,HR. All of the resistors R have the same value, which may be calculated; by means of the following equation:

$$R = \frac{Z(N-2)}{2N} \tag{1}$$

where Z is the desired termination impedance (e.g., 600 ohms) and N is the total number of ports, or legs, in the bridge. Thus, the resistors in a 600 ohm 2-wire, 4-port bridge will have a calculated value of 150 ohms, which produces a port-to-port insertion loss of about 9.5 dBm.

All of the ports in the FIG. 1 bridge are functionally equivalent, and may serve as either input or output ports as required. Ordinarily, only one port functions as an input port at any given time, however. In a central office environment, it is necessary to provide additional padding in series with the bridge to raise the total insertion loss, including cabling losses, to 23 dB. This is a significant drawback, because in addition to the cost of the added equipment (the pad and the necessary jumpers), the pad occupies valuable space in the distributing frame and records must be kept of the pads and their assignments.

Figure 2:
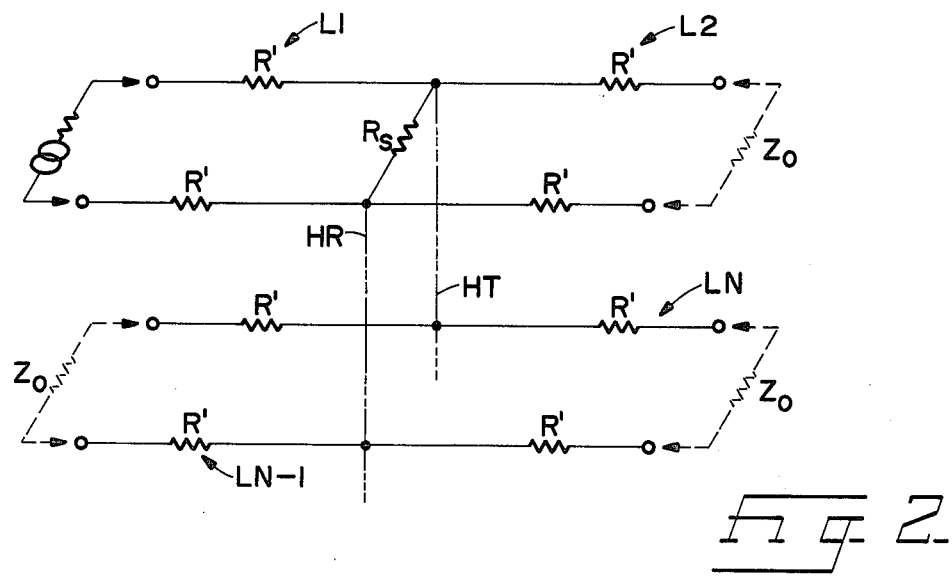
FIG. 2 is a schematic diagram, in generalized form, of a 2-wire, N-port bridge according to the present invention.

An improved bridge design that eliminates the above-mentioned drawback is shown in FIG. 2. The improved bridge generally resembles its prior art counterpart, but includes an additional resistance Rs of selected value shunting the central hubs HT,HR. In accordance with a preferred aspect of the invention, the values of the leg resistors R' and the shunt resistance Rs are chosen such that the bridge exhibits an increased port-to-port insertion loss that, allowing for cabling losses, substantially matches the standardized 23 dB difference between the input and output levels in a four-wire voiceband transmission system. Since, as noted above, central office cabling losses will usually be closed to 0.4 dB, a design value of 22.6 dB is particularly suitable.

The value of the leg resistors R' in an improved 2-wire, N-port bridge having an insertion loss of L dB is found by:

$$R' = \frac{Z(K-1)}{2(K+1)} \quad (2)$$

where $K = 10^{L/20}$.

The value of the shunt resistance Rs is found using the equation:

$$Rs = \frac{1}{\frac{(K^2-1)}{2ZK} - \frac{(N-2)}{(2R'+Z)}} \quad (3)$$

For 600 ohm bridges having from 3 to 14 ports and an intrinsic loss of 22.6 dB, computed values for R' and Rs are as follows:

R = 258.6 ohms (for all sizes)

| Ports | Rs | Ports | Rs |
|---|---|---|---|
| 3 | 97.2 | 9 | 203.5 |
| 4 | 106.5 | 10 | 248.8 |
| 5 | 117.7 | 11 | 320.1 |
| 6 | 131.6 | 12 | 448.7 |
| 7 | 149.2 | 13 | 750.0 |
| 8 | 172.1 | 14 | 2281.7 |

Improved 2-wire, N-port bridges provided according to the invention have a number of advantages. No external padding is required for any bridge within the 3 to 14 port size range. In addition, the same value of leg resistor R' is used for all of the bridges in the family, which results in manufacturing economies.

As with a conventional 2-wire bridge, any unused ports should be terminated by a resistance equal to the line impedance. With the improved bridge design, however, combinations of straps (shorts) and opens may be used instead in many cases to achieve operationally satisfactory results. No more than one 600 ohm termination should be required in any event. The following table illustrates the effect.

| BRIDGE | UNASSIGNED LEGS # | STRAP | OPEN | LOSS, dB | Z, ohms |
|---|---|---|---|---|---|
| 4-, 8- | 1 | 1 | 0 | 23.2 | 594 |
| or | 1 | 0 | 1 | 22.0 | 607 |
| 12-port | 2 | 1 | 1 | 22.7 | 600 |
| 8-port | 3 | 2 | 1 | 23.3 | 594 |
| or | 3 | 1 | 2 | 22.1 | 607 |
| | 4 | 2 | 2 | 22.8 | 599 |
| 12-port | 5 | 3 | 2 | 23.4 | 593 |
| | 5 | 2 | 3 | 22.2 | 606 |
| | 6 | 3 | 3 | 22.9 | 598 |
| 12-port | 7 | 4 | 3 | 23.5 | 592 |
| | 7 | 3 | 4 | 22.3 | 604 |
| | 8 | 4 | 4 | 23.0 | 597 |

As will be seen, if there are an even number of unused ports, half may be shorted and the other half left open—i.e., unterminated—without substantial effect on the bridge's operation. By way of comparison, if one port of a prior art 600 ohm 2-wire, 6-port bridge were left unterminated, the impedance would increase from 600 to 650 ohms and the loss would drop from 14.0 to 12.4 dB.

A further advantage of the bridge design described herein is that a bridge with unneeded ports can easily be converted to one of lesser capacity by changing the shunt resistance Rs to the appropriate value. The unused ports are then simply left unterminated and have no significant effect on bridge operation.

While the best mode presently contemplated has been set forth herein, it will be appreciated that various changes and modifications are possible within the ambit of the above teachings. It is therefore to be understood that the lawful scope of the invention is limited only as required by the express terms of the appended claims.

We claim as our invention:

1. A 2-wire multileg resistance branching network for interconnecting a plurality of voiceband telecommunication lines in a system having standardized input and output line levels, said network comprising
    electrical conductor means forming a pair of common junctions,
    at least three substantially identical 2-conductor signal transmission legs, each including a pair of input-output terminals and a pair of resistors, one resistor in each leg being connected between one terminal of that leg and one of said junctions, the other resistor in each leg being connected between the other terminal of that leg and the other of said junctions, and
    a shunt resistance connected between said junctions, said leg resistors all being of substantially the same value,
    said shunt resistance having a value selected to provide a network attenuation ratio substantially equal to the difference in said standardized levels.

2. The network of claim 1, wherein said shunt resistance is selected to provide an attenuation ratio of about 22.6 dB.

3. The network of claim 1, wherein said leg resistors have a value of about 260 ohms.

* * * * *